US010411772B1

(12) United States Patent
Matyjas et al.

(10) Patent No.: US 10,411,772 B1
(45) Date of Patent: Sep. 10, 2019

(54) ROBUST SPECTRALLY EFFICIENT LINE-OF-SIGHT (LOS) WIRELESS COMMUNICATIONS WITH GEOMETRICALLY-DISTRIBUTED ANTENNA ARRAYS

(71) Applicant: Government of the United States, as represented by the Secretary of the Air Force, Rome, NY (US)

(72) Inventors: John Matyjas, New York Mills, NY (US); Weifeng Su, East Amherst, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/897,573

(22) Filed: Feb. 15, 2018

Related U.S. Application Data

(60) Provisional application No. 62/537,037, filed on Jul. 26, 2017.

(51) Int. Cl.
*H04B 7/04* (2017.01)
*H04B 7/0456* (2017.01)
(Continued)

(52) U.S. Cl.
CPC ............ *H04B 7/0469* (2013.01); *H01Q 1/28* (2013.01); *H04B 7/0482* (2013.01);
(Continued)

(58) Field of Classification Search
CPC ............... H04B 7/0469; H04B 7/0482; H04B 7/18513; H04W 84/005; H04W 16/28; H01Q 1/28
See application file for complete search history.

(56) References Cited

U.S. PATENT DOCUMENTS

| 2005/0020310 | A1* | 1/2005 | Nakaya | .................... H01Q 3/26 455/562.1 |
| 2009/0296846 | A1* | 12/2009 | Maru | ................... H04B 7/0413 375/267 |
| 2019/0036573 | A1* | 1/2019 | Park | ..................... H04B 7/0417 |

OTHER PUBLICATIONS

Alamouti, Siavash M., "A Simple Transmit Diversity Technique for Wireless Communications," IEEE Journal on Select Areas in Communications, vol. 16, No. 8, Oct. 1998.

(Continued)

*Primary Examiner* — Jean B Corrielus
(74) *Attorney, Agent, or Firm* — Joseph A. Mancini

(57) ABSTRACT

A system, method and computer program product for line of sight (LOS) communications using multiple-input-output (MIMO) communications is disclosed. The system includes a first platform having at least one transmit antenna element and at least one receive antenna element forming a first antenna array. A second platform having at least one transmit antenna element and at least one receive antenna element forms a second antenna array in wireless communication with the first array. Corresponding angles for antenna elements in the first antenna array and antenna elements in the second antenna array relative to a 3-D Cartesian coordinate system are determined to achieve a maximum three-dimensional (3-D) MIMO capacity, and the plurality of antenna elements are adaptively adjusted to maintain the maximum 3-D MIMO capacity by minimizing a zenith angle between each of the transmit antenna elements and receive antenna elements relative to a plane defined by the coordinate system over a LOS link.

19 Claims, 6 Drawing Sheets

(51) Int. Cl.
   *H04B 7/185* (2006.01)
   *H04W 16/28* (2009.01)
   *H01Q 1/28* (2006.01)
   *H04W 84/00* (2009.01)
(52) U.S. Cl.
   CPC ........ *H04B 7/18513* (2013.01); *H04W 16/28* (2013.01); *H04W 84/005* (2013.01)

(56) References Cited

OTHER PUBLICATIONS

Biglieri et al., "MIMO Wireless Communications", Cambridge University Press, Dec. 2009.
Bjornson et al., "Massive MIMO for Maximal Spectral Efficiency: How Many Users and Pilots Should be Allocated?," IEEE Transactions on Wireless Communications, vol. 16, No. 2, Feb. 2016.
Bjornson et al., "Massive MIMO Systems with Non-Ideal Hardware: Energy Efficiency, Estimation, and Capacity Limits," IEEE Transactions on Information Theory, vol. 60, No. 11, Nov. 2014.
Bohagen et al., "On Spherical vs. Plane Wave Modeling of Line-of-Sight MIMO Channels," IEEE International Symposium on Personal, Indoor and Mobile Radio Communication, Helsinki, Finland, Sep. 2006.
Bohagen et al., "Design of Capacity-Optimal High-Rank Line-of-Sight MIMO Channels," University of Oslo Research Report 352, Mar. 2007.
Cheng et al., "Communicating in the Real World: 3D MIMO," IEEE Wireless Communications, Jun. 2014.
G. J. Foschini, "Layered space-time architecture for wireless communication in a fading environment when using multiple antennas," Bell Labs Tech. J., No. 2, pp. 41-59, 1996.
M. J. Gans, "Aircraft free-space MIMO communications," in Proc. 43rd Asilomar Conf. on Signals, Systems and Computers, pp. 663-666, Pacific Grove, CA, Nov. 1-4, 2009.
D. Gesbert, H. Bolcskei, D. A. Gore, and A. Paulraj, "Outdoor MIMO wireless channels: Models and performance prediction," IEEE Trans. on Comm., vol. 50, No. 12, pp. 1926-1934, Dec. 2002.
A. Goldsmith, Wireless Communications. New York, NY: Cambridge Univ. Press, 2005.
B. M. Hochwald and T. L. Marzetta, "Unitary space-time modulation for multiple-antenna communication in Rayleigh flat fading," IEEE Trans. on Info. Theory, vol. 46, No. 2, pp. 543-564, 2000.
J. Hoydis, S. ten Brink, and M. Debbah, "Massive Mimo in the UL/DL of cellular networks: How many antennas do we need?," IEEE J. Selected Areas Communications, vol. 31, No. 2, pp. 160-171, 2013.
P.-H. Kuo, and T.-H. Tsai, "Introduction to recent advances in 3D-MIMO techniques and standardizations," Journal of Information and Communication Technology, Article ID: 104-08-25, Oct. 2016.
P. Kyritsi and D. Chizhik, "Capacity of multiple antenna systems in free space and above perfect ground," IEEE Comm. Letters, vol. 6, No. 8, pp. 325-327, Aug. 2002.
Y. Li, X. Ji, D. Liang, and Y. Li, "Dynamic beamforming for three-dimensional MIMO technique in LTE-Advanced networks," International Journal of Antennas and Propagation, vol. 2013, pp. 1-8, Article ID 764507, 2013.
G. Liu, X. Hou, F. Wang, J. Jin, H. Tong, and Y. Huang, "Achieving 3D-MIMO with massive antennas from theory to practice with evaluation and field trial results," IEEE Systems Journal, pp. 62-71, vol. 11, No. 1, Mar. 2017.
T. L. Marzetta, "Noncooperative cellular wireless with unlimited numbers of base station antennas," IEEE Transactions on Wireless Communications, vol. 9, No. 11, pp. 3590-3600, 2010.
H. Ngo, E Larsson, and T. Marzetta, "Energy and spectral efficiency of very large multiuser MIMO systems," IEEE Transactions on Communications, vol. 61, No. 4, pp. 1436-1449, 2013.
W. Su, John D. Matyjas, Michael J. Gans, and Stella N. Batalama, "Maximum achievable capacity in airborne MIMO communications with arbitrary alignments of linear transceiver antenna arrays," IEEE Transactions on Wireless Communications, vol. 12, No. 11, pp. 5584-5593, Nov. 2013.
W. Su, Z. Safar, and K. J. R. Liu, "Full-rate full-diversity space-frequency codes with optimum coding advantage," IEEE Trans. on Info. Theory, vol. 51, No. 1, pp. 229-249, Jan. 2005.
W. Su and X.-G. Xia, "Signal constellations for quasi-orthogonal space-time block codes with full diversity," IEEE Trans. on Info. Theory, vol. 50, No. 10, pp. 2331-2347, Oct. 2004.
V. Tarokh, N. Seshadri, and A. R. Calderbank, "Space-time codes for high data rate wireless communication: Performance criterion and code construction," IEEE Trans. on Info. Theory, vol. 44, No. 2, pp. 744-765, 1998.
V. Tarokh, H. Jafarkhani, and A. R. Calderbank, "Space-time block codes from orthogonal designs," IEEE Trans. on Info. Theory, vol. 45, pp. 1456-1467, Jul. 1999.
I. E. Telatar, "Capacity of multi-antenna Gaussian channels," AT&T Bell Labs., Tech. Rep., 1995.
G. J. Foschini and M. J. Gans, "On limits of wireless communications in a fading environment when using multiple antennas," Wireless Personal Comm., vol. 6, pp. 311-335, Mar. 1998.

\* cited by examiner

ROBUST SPECTRALLY EFFICIENT LINE-OF-SIGHT (LOS) WIRELESS COMMUNICATIONS WITH GEOMETRICALLY-DISTRIBUTED ANTENNA ARRAYS

CROSS REFERENCE TO RELATED APPLICATIONS

This application claims the benefit of U.S. Provisional Application No. 62/537,037 filed Jul. 26, 2017, the entire content of which is hereby incorporated by reference.

STATEMENT OF GOVERNMENT INTEREST

The invention described herein may be manufactured, used, and licensed by or for the Government of the United States for all governmental purposes without the payment of any royalty.

BACKGROUND

Multiple-input-multiple-output (MIMO) communication techniques are widely deployed in ground or near-ground wireless cellular and local area networks such as 4G LTE and Wi-fi networks. They provide substantial capacity increases compared to conventional single-input-single-output (SISO) systems. In cellular or Wi-fi environments, wireless channels between transmit antennas and receive antennas exhibit random fading due to rich scattering, which is often characterized as Rayleigh fading. It has been shown that the capacity of MIMO systems subject to Rayleigh fading increases linearly with the number of transmit antennas, provided that the number of receive antennas is not less than that of transmit antennas. The feasibility of applying the MIMO concept to airborne ad-hoc networks has been studied where aircraft or unmanned-aerial-vehicles (UAV) communicate with each other through multiple antennas carried within each aircraft. However, key challenges exist in airborne or free-space MIMO wireless communications, such as: (i) the absence of rich scattering and reflections; and (ii) the link between each transmit antenna and each receive antenna being an essentially line-of-sight Gaussian channel. Consequently, three-dimensional (3-D) spatial MIMO channels may be highly correlated as they induce a singular MIMO channel matrix, and thus may not offer the promising capacity increase compared to the conventional ground/near-ground MIMO wireless communications.

In view of the above, it is advantageous to provide a robust, spectrally efficient line-of-sight (LoS) communication system with geometrically-distributed antenna arrays.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1B:
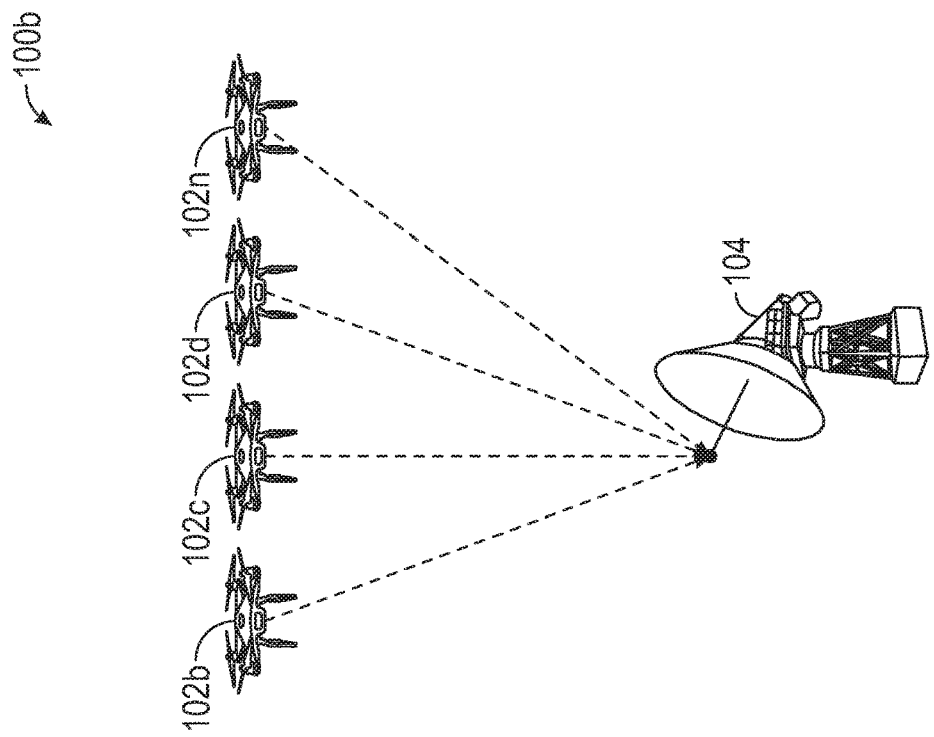
FIGS. 1(a)-1(c) pictorially represent high-level schematic diagrams of exemplary environments for embodiments with geometrically-distributed antenna arrays for line-of-sight (LoS) communications in accordance with the disclosure.

Specific embodiments of the disclosure will now be described in detail with reference to the accompanying figures. While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

In general, a system, method and computer program product for line of sight (LOS) communications using multiple-input-output (MIMO) communications is disclosed. The system includes a first platform having at least one transmit antenna element and at least one receive antenna element forming a first antenna array. A second platform having at least one transmit antenna element and at least one receive antenna element forms a second antenna array in wireless communication with the first array. Corresponding angles for antenna elements in the first antenna array and antenna elements in the second antenna array relative to a 3-D Cartesian coordinate system are determined to achieve a maximum three-dimensional (3-D) MIMO capacity, and the plurality of antenna elements are adaptively adjusted by a mechanism to maintain the maximum 3-D MIMO capacity by minimizing a zenith angle between each of the transmit antenna elements and receive antenna elements relative to a plane defined by the coordinate system over a LOS link.

In accordance with an embodiment, the first antenna array is disposed on an aerial vehicle.

In accordance with yet another embodiment, the first antenna array is disposed on a satellite.

In accordance with still another embodiment, a first array of transmit antenna elements and receive antenna elements are disposed on a first aerial vehicle, and a second array of transmit antenna elements and receive antenna elements are disposed on a second aerial vehicle. The first and second the antenna elements on each aerial vehicle are dynamically adjusted as the zenith angle changes in response to relative motion between the aerial vehicles.

In accordance with yet another embodiment, a first array of transit antenna elements and receive antenna elements are disposed on an aerial vehicle, and a second array of transmit antenna elements and receive antenna elements are disposed on a ground communication link. The first and second antenna elements on the aerial vehicle and the ground communication link are dynamically adjusted as the zenith angle changes in response to motion between the aerial vehicle and the ground communication link.

In accordance with a further embodiment, the number of antenna elements in the first antenna array M_t and the number of antenna elements in the second antenna array M_r are determined to maximize the MIMO capacity.

In accordance with yet another embodiment, the spatial separation of the antenna elements for each of the antenna arrays s_t and s_r is determined to maximize the MIMO capacity.

Figure 1A:
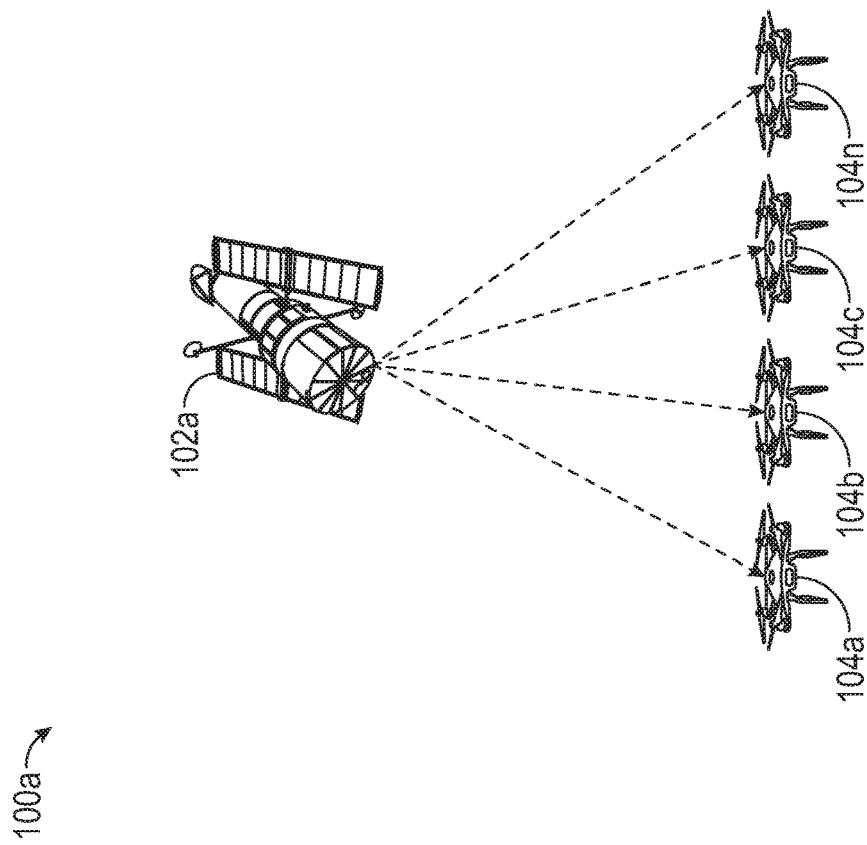
Figure 1C:
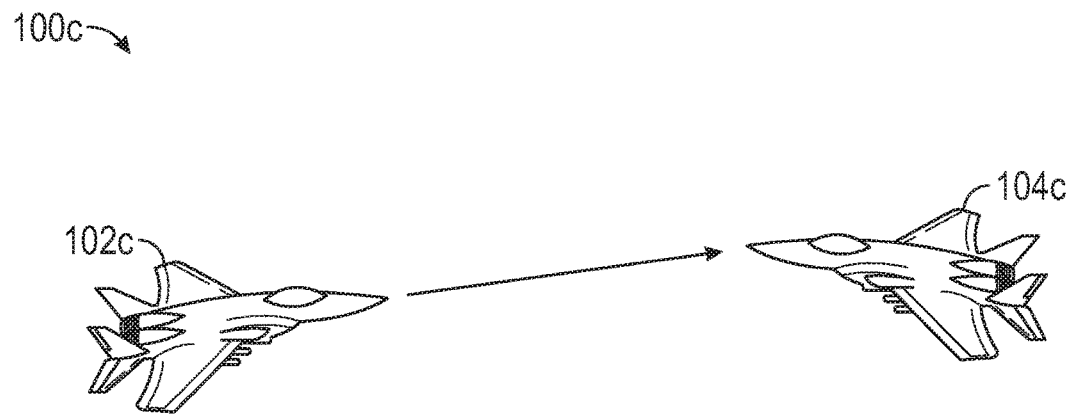

FIGS. 1(a)-1(c) pictorially represent high-level schematic diagrams of exemplary environments for embodiments with geometrically-distributed antenna arrays for line-of-sight (LoS) communications in accordance with the disclosure. FIG. 1(a) shows a system 100a with a wireless communication link between a satellite 102a and a plurality of aerial vehicles $104a_{1, \ldots, N}$. The aerial vehicles $104a_{1, \ldots, N}$ illustrated in the drawing are conceptually depicted as drones, but may encompass any aerial vehicle such as a fixed wing aircraft (i.e., commercial or military), rotorcraft, or lighter-than-air platform (i.e., balloon, airship, etc.). Likewise, such an environment can include satellite—ground communication links. The communication satellites that are considered include Geostationary (GEO) communication satellites, Medium Earth Orbit (MEO) communication satellites, and Low Earth Orbit (LEO) communication satellites. FIG. 1(b) pictorially illustrates a system 100b with a wireless communication link between a plurality of aerial vehicles $102a_{1, \ldots, N}$ and a ground link 104. The ground communication units can be surface receiver/processing units. Finally, FIG. 1(c) shows a system 100c with an illustrative air-to-air link between two fixed-wing aircraft 102c, 104c. Embodiments of the disclosure permit the practical design of spectrally efficient LoS communication links to reach the best possible communication capacity by properly placing antenna elements at satellites and distributed drones/aircraft and selecting optimal system parameters.

Figure 2A:
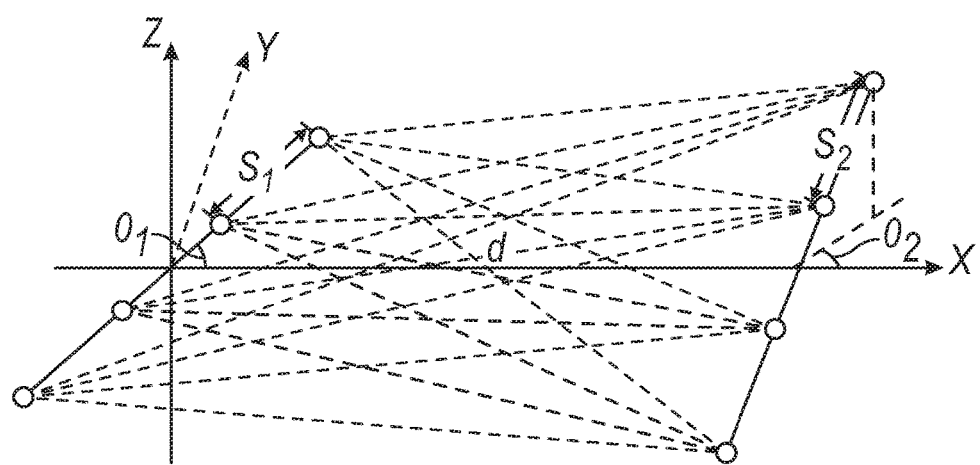
FIG. 2(a) is a diagram of an illustrative 3-D model for spatial LoS MIMO communications where the capacity of 3-D spatial MIMO systems with linear transmit and receive antenna arrays in arbitrary 3-D alignments.

Referring now to FIG. 2(a), there is depicted an illustrative three-dimensional (3-D) model for spatial LoS MIMO communications where the capacity of 3-D spatial MIMO systems with linear transmit and receive antenna arrays in arbitrary 3-D alignments (a 3-D model is necessary for two flying aircraft with transceiver antenna arrays) was systematically analyzed. A necessary and sufficient condition for the 3-D spatial MIMO systems to achieve maximum capacity for any given transceiver antenna array geometry in the 3-D LoS space was developed. Conditions presented for the selection of system parameters (e.g. antenna element separation) to reach the optimal capacity value for any given transceiver antenna array geometry in the 3-D space are true only when the zenith angle between the linear transmit and receive antenna arrays is equal to zero, i.e. the transmitter and receiver antenna arrays are aligned on the same plane.

As will be understood by those skilled in the art, this is a probabilistically rare event with any two aerial vehicles (each with unique yaw/pitch/roll), while the transceiver antenna array elements are each fixed on the aircraft, respectively.

The LoS antenna array technology in accordance with embodiments of the disclosure differs from the massive MIMO technology cellular 3-D MIMO concepts, in that the former is targeting LoS Gaussian channels, while the latter are targeting reflection-rich environments with Rayleigh fading communication channels for spectrum sharing. Thus, 3-D spatial LoS MIMO capacity differs significantly from that of ground MIMO scenarios. Embodiments of the present disclosure provide enhanced capacity by properly aligning 3-D spatial MIMO antenna arrays. As will be appreciated by those skilled in the art, characteristics of airborne or free-space MIMO wireless communications include: (i) the absence of rich scattering and reflections; and (ii) a line-of-sight Gaussian channel link between each transmit antenna and each receive antenna. Consequently, 3-D spatial LoS MIMO channels may be highly correlated, where they induce a singular (ill-conditioned) MIMO channel matrix. To improve performance, a necessary and sufficient condition on system parameters is utilized to achieve the best possible capacity for any given transceiver antenna array geometry in the 3-D space. The necessary and sufficient condition permits the design of 3-D spatial MIMO communication systems by selecting proper system parameters to reach the best possible capacity. It is worth noting that the capacity value is larger than the average capacity of the corresponding conventional MIMO communication system under Rayleigh fading.

Turning now to FIG. 2(a), in the exemplary model the transmit antennas are equally spaced with separation $S_t$ meters while the receive antennas are equally spaced with separation $S_r$ meters. Let us consider a 3-D Cartesian coordinate system and, without loss of generality, assume that the transmit antenna array is in the (x; y)-plane with its center located at the origin. The transmit antenna array is assumed to have an angle $\theta_t \in [0, 2\pi)$ from the x-axis. We further assume that the center of the receive antenna array is on the x-axis, and the distance between the centers of the two antenna arrays is d meters. The receive antenna array is assumed to be at an angle $\theta_r \in [0, 2\pi)$ from the (x; z)-plane and at a zenith angle $\phi \in [-\pi, \pi)$ from the (x; y)-plane. With the general 3D model, we are able to characterize the coordinates of each transmit antenna element and the coordinates of each receive antenna element. Then the channel coefficient between the m-th transmit antenna and the n-th receive antenna can be modeled as:

$$h_{m,n} = \frac{\lambda}{r_{m,n}} e^{-j2\pi \frac{r_{m,n}}{\lambda}}$$

where $\lambda$ is the carrier wavelength and $r_{m,n}$ is the distance between the m-th transmit antenna and the n-th receive antenna.

In accordance with an embodiment of the disclosure, a necessary and sufficient condition for 3-D spatial MIMO communication systems to achieve maximum capacity is represented by the following theorem: A 3-D spatial MIMO comm. system achieves the maximum capacity $$\tilde{C}_{airborne} = \min(M_t, M_r) \log_2 \left(1 + \frac{\max(M_t, M_r)}{M_t} \frac{P\lambda^2}{N_0 d^2}\right)$$

if and only if the antenna array alignment satisfies the following two conditions:

(i) There exists a non-zero integer p such that:

$$s_t s_r \cos\phi \sin\theta_t \sin\theta_r = \frac{p\lambda d}{\max(M_t, M_r)}$$

(ii) For any m=1, 2, ..., min($M_t$,$M_r$)−1, there does not exist an integer $q_m$ such that:

$$s_t s_r \cos\phi \sin\theta_t \sin\theta_r = \frac{q_m \lambda d}{m}.$$

The necessary and sufficient condition developed in the Theorem above provides the optimal alignment between the transceiver antenna arrays in order to achieve maximum capacity. The model demonstrates that the antenna element separation condition is optimized when the zenith angle between the transceiver antenna arrays is zero, i.e., when the transmitter and receiver antenna arrays are aligned on the same plane. When the zenith angle of the transceiver antenna arrays is not zero (which is the typical scenario in 3-D spatial LoS MIMO networks), the maximum capacity is not guaranteed.

Figure 2B:
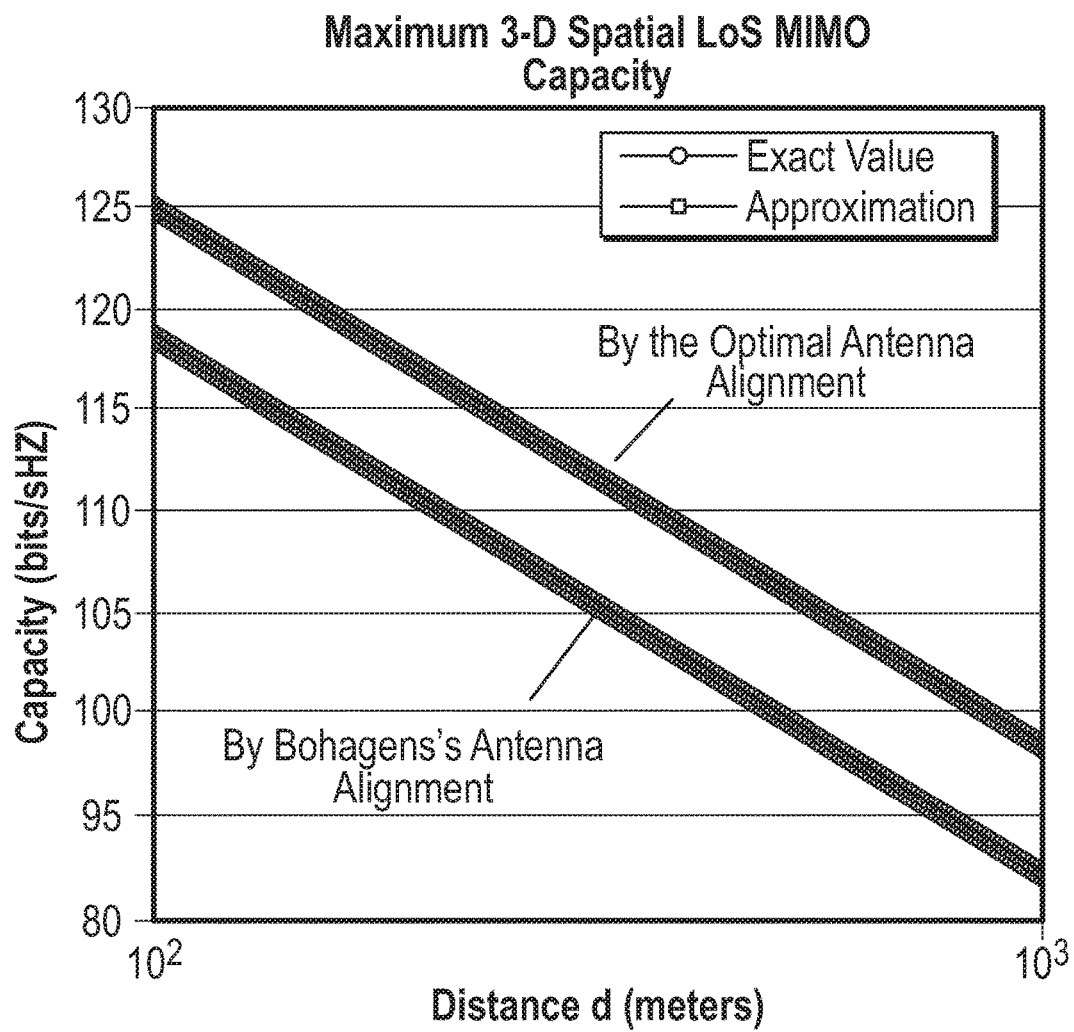
FIG. 2(b) is a graph of the resulting 3-D spatial MIMO capacity based on various antenna array alignments.

With reference to FIG. 2(b), there is illustrated a graph of the resulting 3-D spatial MIMO capacity based on various antenna array alignments. In the exemplary application, it is assumed that the system operates in the 10 GHz band, and the transmission power is P=−10 dBm (watts/Hz), where $$M_t = M_r = 4, \theta_t = \theta_r = \frac{\pi}{2},$$

and $$\phi = \frac{\pi}{3}.$$

It will be understood by those skilled in the art that when the zenith angle between the transceiver antenna arrays is not zero, the resulting MIMO capacity based on Bo Hagen's condition fails to achieve maximum capacity. The optimal condition in accordance with the above Theorem achieves maximum 3-D spatial MIMO capacity, and demonstrates a capacity increase of 7 bits/s/Hz. Numerical studies have demonstrated that the capacity gain increases as the respective sizes of the antenna arrays increase.

The necessary and sufficient condition developed in the above Theorem guarantees the best possible 3-D spatial LoS MIMO capacity for any given 3D geometry described by $\theta_t$, $\theta_r$, and $\phi$ of two linear transceiver antenna arrays onboard two aerial vehicles where $\theta_t$, $\theta_r$, and $\phi$ depend on the flight patterns of the aircraft and thus their relative translation. From a practical implementation standpoint, adaptively activated antenna elements that adjust their respective separation in accordance with the conditions set forth in the Theorem allows for the highest capacity for any given value of $\phi_t$, $\phi_r$, and $\phi$.

Figure 3:
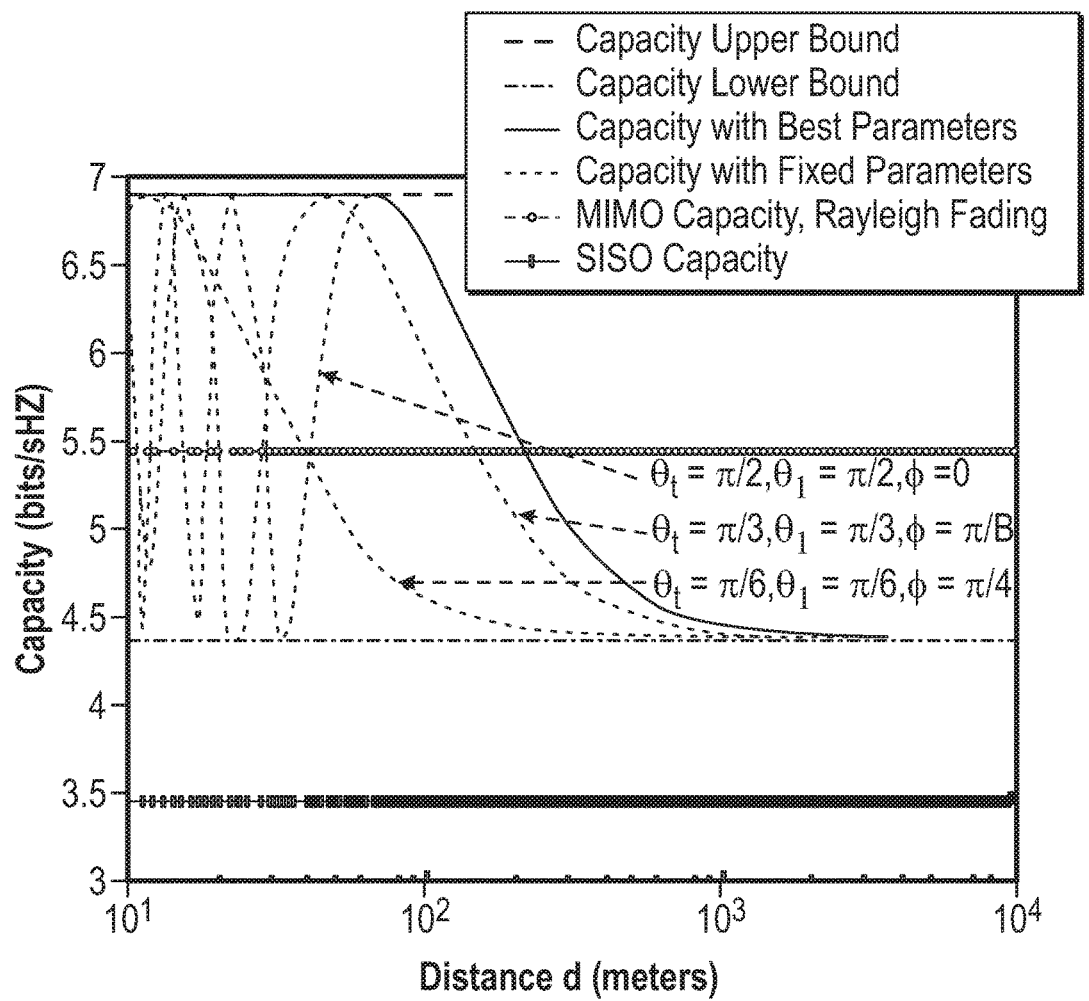
FIG. 3 is a graph depicting the capacity of a 3-D spatial MIMO LoS system with different antenna array alignments, and a comparison to the capacity of SISO and Rayleigh fading scenarios.

With reference to FIG. 3, there is illustrated a graph depicting the capacity of a 3-D spatial MIMO LoS system with different antenna array alignments, and a comparison to the capacity of SISO and Rayleigh fading scenarios. As can be seen from the drawing, there is a significant increase in capacity when the arrays are aligned in accordance with embodiments of the disclosure.

It will be appreciated that the larger the size of the antenna array, the greater the communication capacity. Specifically, and with reference to FIG. 1(a), a GEO/MEO/LEO communication satellite 102a is placed into orbit at an altitude of d meters in space. The satellite 102a is equipped with $M_t$ antennas that are equally spaced with separation $S_t$ meters, and the wavelength of the carrier signals is $\lambda$ meters. A set of N drones/aerial vehicles ($104a_1, \ldots, _N$) are deployed to form a geometrically-distributed antenna array. In accordance with the disclosure, the separation of adjacent drones should be designed based on the following calculation:

$$s_r = \frac{d\lambda}{\max(M_t, N)s_t} \text{(meter)}.$$

The larger the number of drones/aerial vehicles deployed in any given system, the greater the communication capacity. For example, in a system with two antennas on the satellite 102a and two drones $104_1$, $104_2$, a 100% increase in communication capacity may be advantageously achieved as compared to a traditional single-antenna system design. However, it is critical the antenna element separation in the geometrically-distributed antenna array be properly chosen, otherwise there is no capacity gain. In summary, increases in capacity in accordance with the above methodology is achievable only with the optimum parameter selection according to the method disclosed herein. Due to space limitations on the satellite, it is desirable to minimize the number of antennas deployed on the satellite. However, a large number of geometrically-distributed drones/aerial vehicles may be deployed such that $N \geq M_t$. In accordance with the above methodology, a communication link utilizing this configuration can achieve a communication capacity of:

$$C = M_t \log_2\left(1 + \frac{N}{M_t} \frac{P\lambda^2}{N_0 d^2}\right) \text{(bits/s/Hz)}.$$

accordance with the above methodology, a communication link utilizing this configuration can achieve a communication capacity of:

In another example, there is described the design of a communication link from a communication satellite 102a to a ground station (not shown) via geometrically-distributed drones ($104a_1, \ldots, _N$) relaying communication signals over-the-air. In this expedient, there is deployed the Mobile User Objective System (MUOS), $$C = M_t \log_2\left(1 + \frac{N}{M_t} \frac{P\lambda^2}{N_0 d^2}\right) \text{(bits/s/Hz)}.$$

which is a SATCOM system using GEO satellites being placed in geo-stationary orbit at an altitude of 35,400 km in space. Each of drones $104a_1, \ldots, _N$ is equipped with a single transceiver antenna to form a geometrically distributed antenna array in the air. The altitude of the drones $104a_1, \ldots, _N$ and their separation distance aloft is designed to maximize the communication capacity while saving transmission power at the GEO satellite, which is an important benefit as such satellites have limited power supplies. It is assumed the GEO satellite 102a employs two transmit antennas with spatial separation $S_t$ meters, and a signal carrier frequency of $f_c$ Hz. It is further assumed that the N drones form the geometrically distributed antenna array in the air. In accordance with the methodology of the present disclosure, the separation between adjacent drones is selected based on the following calculation:

$$s_r = \frac{3.54 \times 10^7 c}{s_t f_c N} \text{(meter)}$$

where $c=3 \times 10^8$ m/s (the speed of light). For example, if the carrier frequency is $f_c=60$ GHz and the separation between the antennas at the satellite is $s_t=2$ m and N=2, then the separation of the two drones should be 44.25 km in accordance with the present disclosure. If N=4 drones are deployed, then the separation of two adjacent drones should be 22.125 km based on the above calculation. Thus, the LoS communication link implementation based on geometrically-distributed drones achieves a 100% increase in terms of communication capacity as compared to traditional approaches in the described scenario.

Figure 4:
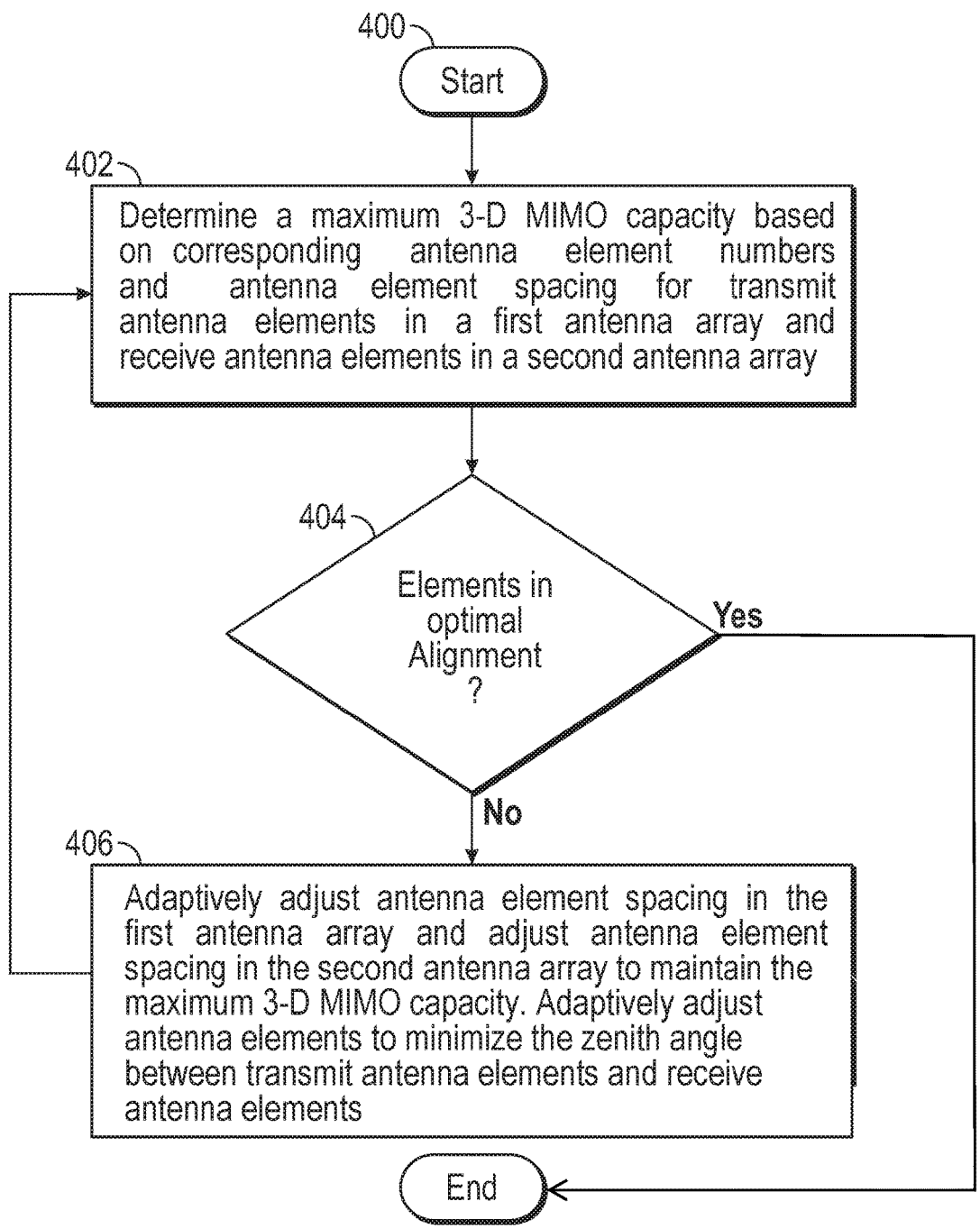
FIG. 4 is a flow diagram of a process in accordance with an embodiment of the disclosure for a MIMO communication method for LOS communications.

Referring now to FIG. 4, there is depicted a flow diagram of a process in accordance with an embodiment of the disclosure for a MIMO communication method for LOS communications. The process begins at block 400 and proceeds to block 402, where a processor executes computer program instructions stored in a non-tangible memory medium to cause the processor to determine a maximum 3-D MIMO capacity based on based on corresponding antenna numbers and antenna element spacing for transmit antenna elements in a first antenna array and receive antenna elements in a second antenna array. In block 404, if the elements are in optimal alignment with a maximized communication capacity, nothing is changed until the capacity is determined to be less than optimal in block 402. Otherwise, in block 406 the antenna element spacing in the first antenna array and the antenna element spacing in the second antenna array for the plurality of antenna elements are adaptively adjusted to maintain the maximum 3-D MIMO capacity by minimizing a zenith angle between each of the transmit antenna elements and receive antenna elements relative to a plane defined by the coordinate system over a LOS link. The adaptive adjustment may be accomplished via any number of computer controlled mechanisms of the type known in the art. The antennas may be coupled to an adjustment mechanism, such as for example, disposed on motorized supports that are configured to move spatially in response to control signals in a 3-D coordinate system so as to properly align in accordance with the methodology described above. Such devices are well understood and need not be described in detail herein.

Figure 5:
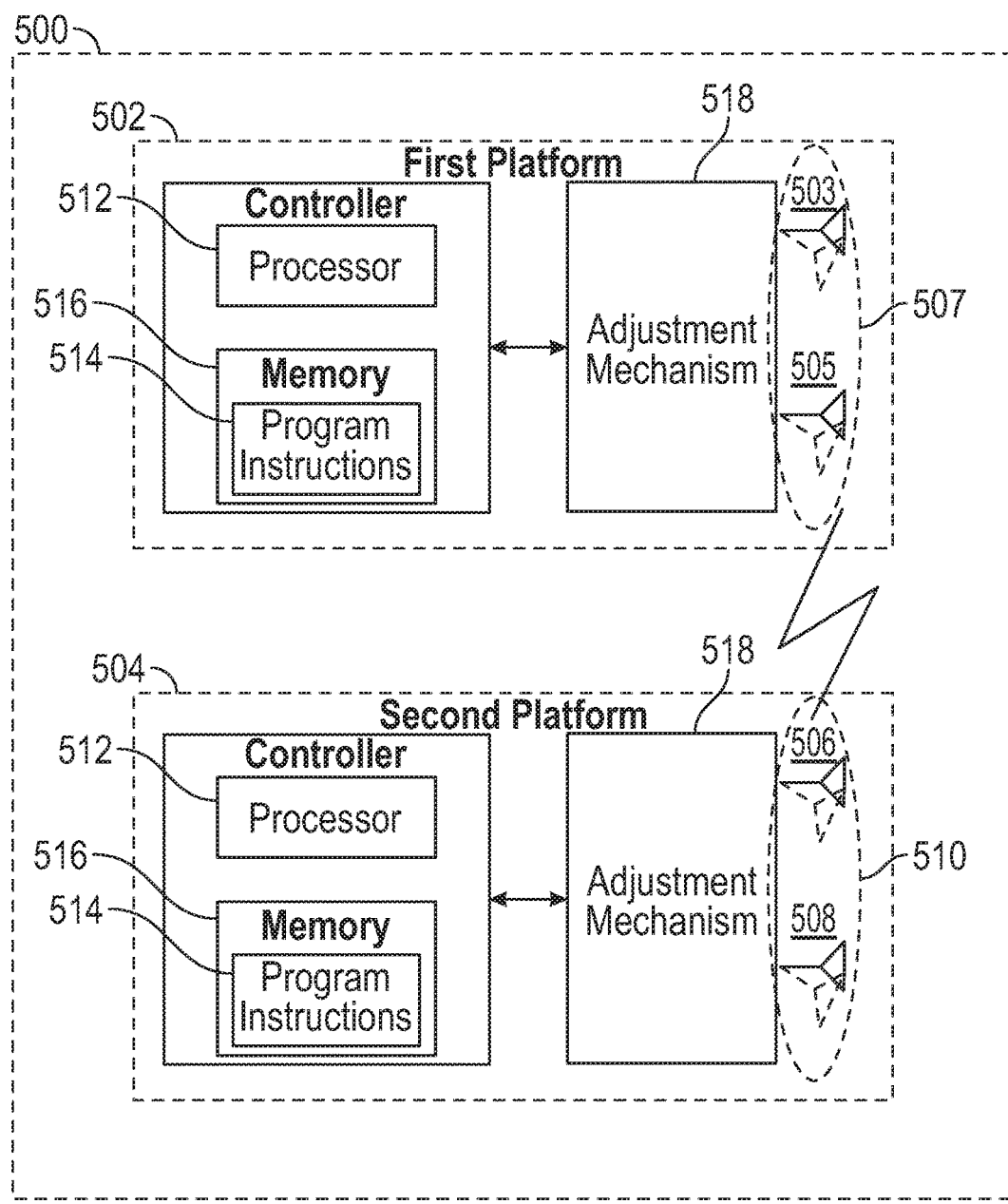
FIG. 5 is a high-level schematic diagram of an architecture for implementing embodiments of the disclosure.

Referring now to FIG. 5, there is shown a schematic diagram of an architecture 500 for implementing embodiments of the disclosure. The architecture 500 includes a first platform 502 having at least one transmit antenna element 503 and at least one receive antenna element 505 forming a first antenna array 507. A second platform 504 has at least one transmit antenna element 506 and at least one receive antenna element 508 forming a second antenna array 510. There is provided a controller incorporating at least one processor 512 that executes computer program instructions 514 stored in a non-tangible memory medium 516 to cause the processor 512 to determine a maximum 3-D MIMO capacity based on corresponding angles for antenna elements in the first antenna array and antenna elements in the second antenna array relative to a 3-D Cartesian coordinate system, and adaptively adjust the plurality of antenna elements to maintain the maximum 3-D MIMO capacity by minimizing a zenith angle between each of the transmit antenna elements and receive antenna elements relative to a plane defined by the coordinate system over a LOS link. The processor 512 can be operably associated with each of the respective platforms 502, 504, where plural processors 512 are configured to synchronize with each other. The respective antenna elements 503, 505, 506, and 508 are operably coupled to an adjustment mechanism to enable translation thereof in the 3-D coordinate system. Control signals generated by the processor 512 are communicated to the adjustment mechanism 518 to proportionally move the respective antenna elements in accordance with the methodology described above. The adjustment mechanism, as described above, can be implemented in many ways in accordance with known devices for moving peripherals under computer control and need not be described in detail here. Such devices include motors with associated transmissions and gearing, piezoelectric actuators that move in response to an applied current, and the like. It will be appreciated by those skilled in the art that the architecture depicted in FIG. 5 is merely exemplary, and that the configuration of the processor, computer program instructions and computer memory, as shown in the simplified schematic, may be embodied in a hardwired dedicated controller of the type known in the art.

The above systems, devices, methods, processes, and the like may be realized in hardware, software, or any combination of these suitable for an application. The hardware may include unique digital processing, a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in several ways. At the same time, processing may be distributed across devices such as the various systems described above, or all the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method according to causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method according to directing or controlling any combination of such other individuals or resources to perform steps X, Y, and Z to obtain the benefit of such steps. Thus, method steps of the implementations described herein are intended to include any suitable method according to causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A multiple-input-output (MIMO) communication method for line of sight (LOS) communications, comprising:
executing computer program instructions stored in a non-tangible memory medium to cause a processor to determine corresponding angles for transmit antenna elements in a first antenna array and receive antenna elements in a second antenna array relative to a 3-D Cartesian coordinate system to achieve a maximum three-dimensional (3-D) MIMO capacity; and
signaling a mechanism to adaptively adjust the transmit and receive antenna elements to maintain the maximum 3-D MIMO capacity by minimizing a zenith angle between each of the transmit antenna elements and receive antenna elements relative to a plane defined by the 3-D Cartesian coordinate system over a LOS link.

2. The method according to claim 1, where the first antenna array is disposed on an aerial vehicle.

3. The method according to claim 1, where the first antenna array is disposed on a space vehicle.

4. The method according to claim 1, where a first array of transmit antenna elements and receive antenna elements are disposed on a first aerial vehicle, and a second array of transmit antenna elements and receive antenna elements are disposed on a second aerial vehicle, the first and second arrays of transmit and receive antenna elements on each first and second aerial vehicle being dynamically adjusted as the zenith angle changes in response to relative motion between the aerial vehicles.

5. The method according to claim 1, where a first array of transit antenna elements and receive antenna elements are disposed on an aerial vehicle, and a second array of transmit antenna elements and receive antenna elements are disposed on a ground communication link, the first and second arrays of transmit and receive antenna elements on the aerial vehicle and the ground communication link being dynamically adjusted as the zenith angle changes in response to motion between the aerial vehicle and the ground communication link.

6. The method according to claim 1, where the maximum MIMO capacity is represented by:

$$\tilde{C}_{airborne} = \min(M_t, M_r)\log_2\left(1 + \frac{\max(M_t, M_r)}{M_t}\frac{P\lambda^2}{N_0 d^2}\right)$$

and an antenna array alignment for N aerial vehicles that define an antenna array satisfies condition:
(i) for a non-zero integer p such that $$s_t s_r \cos\phi \sin\theta_t \sin\theta_r = \frac{p\lambda d}{\max(M_t, M_r)}$$

(ii) for any m=1, 2, . . . , min (M$_t$, M$_r$)−1, there does not exist an integer q$_m$ such that $$s_t s_r \cos\phi \sin\theta_t \sin\theta_r = \frac{q_m \lambda d}{m}$$

where $\theta_t$ corresponds to a transmit antenna array angle relative to an (x; y) plane, $\theta_r$ corresponds to a receive antenna array angle relative to an (x; z) plane and Å is a zenith angle of the (x; y) plane of the 3-D Cartesian coordinate system, and a distance between centers of the arrays is d, M$_t$ are a number of transmit antennas, Mr are a number of receive antennas, s$_t$ is the separation between transmit antennas, s$_r$ is the separation between receive antennas, m is the distance between corresponding transmit and receive antennas, and p is a non-zero integer.

7. The method according to claim 6, where a number of antenna elements in a first antenna array M_t and a number of antenna elements in a second antenna array M_r are determined to maximize the MIMO capacity.

8. The method according to claim 6, where the separation of the antenna elements for each of the transmit antenna array and the receive antenna array are determined to maximize the MIMO capacity.

9. The method according to claim 6, where a separation distance s of N adjacent aerial vehicles with M antennas that maximizes the MIMO capacity is represented by:

$$s_r = \frac{d\lambda}{\max(M_t, N)s_t}$$

where a wavelength of carrier signals is λ.

10. A system for line of sight (LOS) communications using multiple-input-output (MIMO) communications, comprising:
a first platform comprising at least one transmit antenna element and at least one receive antenna element forming a first antenna array;
a second platform comprising at least one transmit antenna element and at least one receive antenna element forming a second antenna array;
at least one processor executing computer program instructions stored in a non-tangible memory medium to cause the processor to:
determine corresponding angles for antenna elements in the first antenna array and antenna elements in the second antenna array relative to a 3-D Cartesian coordinate system to achieve a maximum three-dimensional (3-D) MIMO capacity; and
signal a mechanism to adaptively adjust the transmit and receive antenna elements of the first and the second antenna arrays to maintain the maximum 3-D MIMO capacity by minimizing a zenith angle between each of the transmit antenna elements and receive antenna elements relative to a plane defined by the 3-D Cartesian coordinate system over a LOS link.

11. The system according to claim 10, where the transmit antenna elements and receive antenna elements are part of a transceiver disposed on an aerial vehicle.

12. The system according to claim 10, where the transmit antenna elements and receive antenna elements are part of a transceiver disposed on a space vehicle.

13. The system according to claim 10, where a first array of transmit antenna elements and receive antenna elements are disposed on a first aerial vehicle, and a second array of transmit antenna elements and receive antenna elements are disposed on a second aerial vehicle, the first and second arrays of transmit and receive the antenna elements on each first and second aerial vehicle being dynamically adjusted as the zenith angle changes in response to relative motion between the aerial vehicles.

14. The system according to claim 10, where a first array of transit antenna elements and receive antenna elements are disposed on an aerial vehicle, and a second array of transmit antenna elements and receive antenna elements are disposed on a ground communication link, the first and second arrays of transmit and receive antenna elements on the aerial vehicle and the ground communication link being dynamically adjusted as the zenith angle changes in response to motion between the aerial vehicle and the ground communication link.

15. The system according to claim 10, where the maximum MIMO capacity is represented by:

$$\tilde{C}_{airborne} = \min(M_t, M_r)\log_2\left(1 + \frac{\max(M_t, M_r)}{M_t} \frac{P\lambda^2}{N_0 d^2}\right)$$

and an antenna array alignment for N aerial vehicles that define an antenna array satisfies condition:

(i) for a non-zero integer p such that $$s_t s_r \cos\phi \sin\theta_t \sin\theta_r = \frac{p\lambda d}{\max(M_t, M_r)}$$

(ii) for any m=1, 2, ..., min $(M_t, M_r)$−1, there does not exist an integer $q_m$ such that $$s_t s_r \cos\phi \cos\theta_t \sin\theta_r = \frac{q_m \lambda d}{m}$$

where $\theta_t$ corresponds to a transmit antenna array angle relative to an (x; y) plane, $\theta_r$ corresponds to a receive antenna array angle relative to an (x; z) plane and Ø is a zenith angle of the (x; y) plane of the 3-D Cartesian coordinate system, and a distance between centers of the arrays is d, $M_t$ are a number of transmit antennas, Mr are a number of receive antennas, $s_t$ is the separation between transmit antennas, $s_r$ is the separation between receive antennas, m is the distance between corresponding transmit and receive antennas, and p is a non-zero integer.

16. The system according to claim 15, where a number of antenna elements in a first antenna array M_t and a number of antenna elements in a second antenna array M_r are determined to maximize the MIMO capacity.

17. The system according to claim 15, where the separation of the antenna elements for each of the transmit antenna array and the receive antenna array are determined to maximize the MIMO capacity.

18. The system according to claim 15, where a separation distance s of N adjacent aerial vehicles with M antennas that maximizes the MIMO capacity is represented by:

$$s_r = \frac{d\lambda}{\max(M_t, N)s_t}$$

where a wavelength of carrier signals is λ.

19. The system according to claim 10, where the mechanism is an adjustment mechanism coupled to motorized supports for the antenna elements, the adjustment mechanism operably configured to move the antenna elements to maintain the maximum 3-D MIMO capacity in response to control signals.

* * * * *